(12) United States Patent
Cho et al.

(10) Patent No.: US 9,007,401 B1
(45) Date of Patent: Apr. 14, 2015

(54) HEAD MOUNTED DISPLAY AND METHOD FOR CONTROLLING THE SAME

(71) Applicant: LG Electronics Inc., Seoul (KR)

(72) Inventors: Eunhyung Cho, Seoul (KR); Jongho Kim, Seoul (KR); Doyoung Lee, Seoul (KR); Jihwan Kim, Seoul (KR); Sinae Chun, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/254,577

(22) Filed: Apr. 16, 2014

(30) Foreign Application Priority Data

Feb. 20, 2014 (KR) .......................... 10-2014-0019523

(51) Int. Cl.
*G06T 19/00* (2011.01)
*G02B 27/01* (2006.01)

(52) U.S. Cl.
CPC ............ *G02B 27/017* (2013.01); *G06T 19/006* (2013.01); *G02B 2027/014* (2013.01)

(58) Field of Classification Search
CPC ............... G06T 19/006; G02B 27/017; G02B 2027/014
USPC .......................................... 345/632, 633, 649
See application file for complete search history.

(56) References Cited

U.S. PATENT DOCUMENTS

| 2004/0201595 | A1* | 10/2004 | Manchester | 345/649 |
| 2012/0127284 | A1* | 5/2012 | Bar-Zeev et al. | 348/53 |
| 2013/0293530 | A1 | 11/2013 | Perez et al. | |
| 2013/0293580 | A1 | 11/2013 | Spivack | |
| 2013/0314406 | A1 | 11/2013 | Lin | |

FOREIGN PATENT DOCUMENTS

| JP | 2006-0154902 A | 6/2006 |
| JP | 2010-257123 A | 11/2010 |

* cited by examiner

*Primary Examiner* — Jeffery A Brier
(74) *Attorney, Agent, or Firm* — Birch, Stewart, Kolasch & Birch, LLP

(57) ABSTRACT

A method for controlling a head mounted display (HMD) includes detecting an external device, wherein the external device displays a content image, displaying a first type augmented reality image associated with the external device, displaying a second type augmented reality image associated with the content image displayed on the external device, changing a display position of the first type augmented reality image according to rotation of the external device, changing a display position of the second type augmented reality image according to rotation of the content image, and if the content image is not rotated, maintaining the display position of the second type augmented reality image even when the external device is rotated. If the external device is not rotated, the display position of the first type augmented reality image may be maintained even when the content image is rotated.

18 Claims, 8 Drawing Sheets

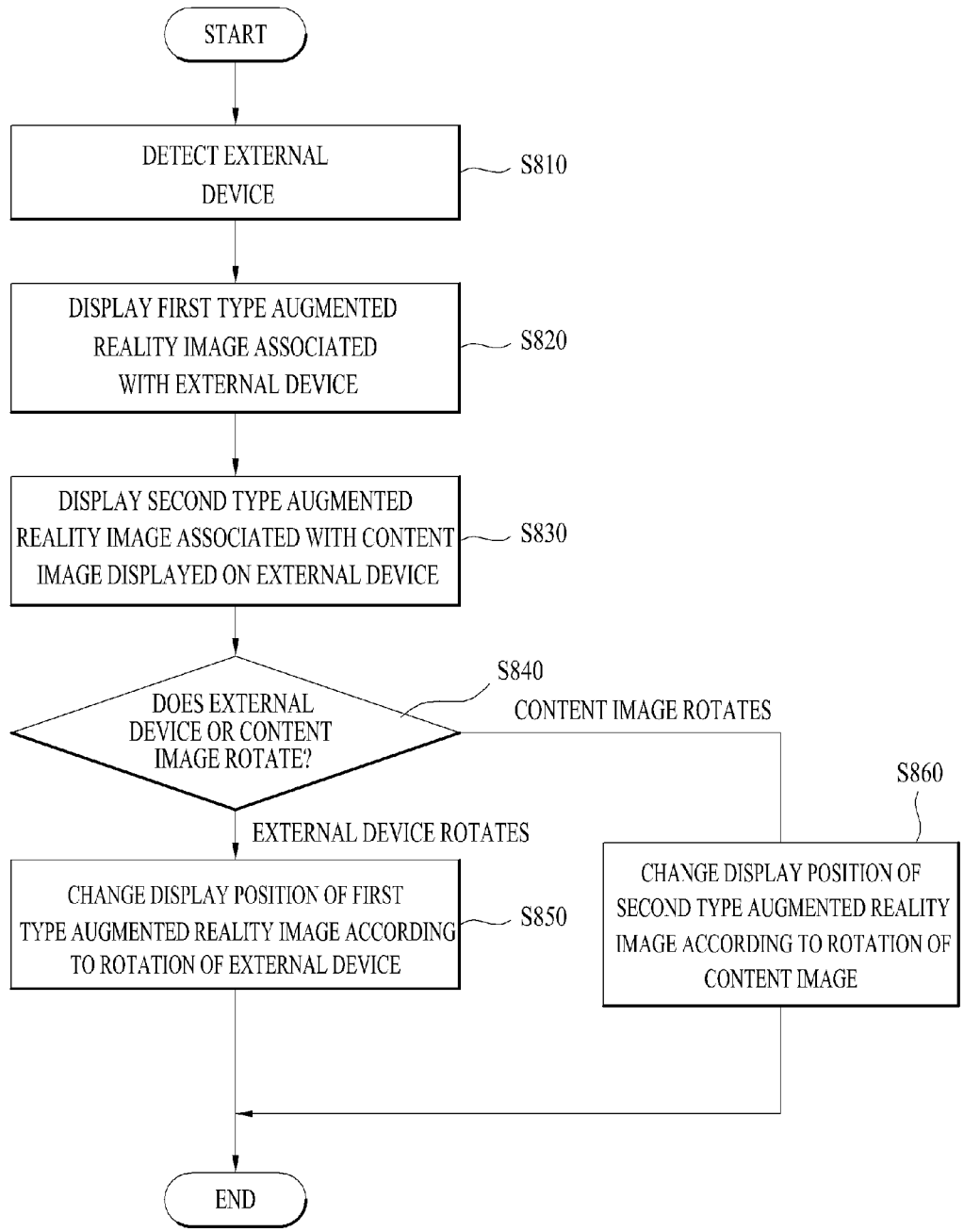

HEAD MOUNTED DISPLAY AND METHOD FOR CONTROLLING THE SAME

Pursuant to 35 U.S.C. §119(a), this application claims the benefit of Korean Patent Application No. 10-2014-0019523 filed on Feb. 20, 2014, which is hereby incorporated by reference as if fully set forth herein.

BACKGROUND OF THE INVENTION

1. Field of the Invention

The present specification relates to a head mounted display (HMD), and more particularly, to an HMD for displaying an augmented reality image and a method for controlling the same.

2. Discussion of the Related Art

An augmented reality service enables a user to view a real image and an augmented reality image to provide real information and virtual information to the user. Recently, as technologies have been developed, a head mounted display (HMD) has been used as a device for providing an augmented reality service.

When an augmented reality service is provided using an HMD, an augmented reality image corresponding to a real object (for example, an external device) and an augmented reality image corresponding to a predetermined part of the real object need to be displayed.

In addition, a method for displaying an augmented reality image corresponding to a real object and an augmented reality image corresponding to a predetermined part of the real object needs to be changed according to rotation of the real object.

SUMMARY OF THE INVENTION

Accordingly, the present specification is directed to a head mounted display (HMD) and a method for controlling the same that substantially obviate one or more problems due to limitations and disadvantages of the related art.

An object of the present specification is to provide an HMD for displaying a first type augmented reality image associated with an external device and a second type augmented reality image associated with a content image displayed on the external device and changing a method of displaying the first type augmented reality image and the second type augmented reality image according to rotation of the external device or rotation of the content image, and a method for controlling the same.

Additional advantages, objects, and features of the specification will be set forth in part in the description which follows and in part will become apparent to those having ordinary skill in the art upon examination of the following or may be learned from practice of the specification. The objectives and other advantages of the specification may be realized and attained by the structure particularly pointed out in the written description and claims hereof as well as the appended drawings.

To achieve these objects and other advantages and in accordance with the purpose of the specification, as embodied and broadly described herein, a head mounted display (HMD) includes a camera unit configured to capture a front image of the HMD, a display unit configured to display an augmented reality image, and a processor configured to control the camera unit and the display unit. The processor is further configured to detect an external device, wherein the external device displays a content image, display a first type augmented reality image associated with the external device, display a second type augmented reality image associated with the content image displayed on the external device, change a display position of the first type augmented reality image according to rotation of the external device, change a display position of the second type augmented reality image according to rotation of the content image, and, if the content image is not rotated, maintain the display position of the second type augmented reality image even when the external device is rotated.

In another aspect of the present specification, a method for controlling a head mounted display (HMD) includes detecting an external device, wherein the external device displays a content image, displaying a first type augmented reality image associated with the external device, displaying a second type augmented reality image associated with the content image displayed on the external device, changing a display position of the first type augmented reality image according to rotation of the external device, changing a display position of the second type augmented reality image according to rotation of the content image, and, if the content image is not rotated, maintaining the display position of the second type augmented reality image even when the external device is rotated.

It is to be understood that both the foregoing general description and the following detailed description of the present specification are exemplary and explanatory and are intended to provide further explanation of the specification as claimed.

BRIEF DESCRIPTION OF THE DRAWINGS

The accompanying drawings, which are included to provide a further understanding of the specification and are incorporated in and constitute a part of this application, illustrate embodiment(s) of the specification and together with the description serve to explain the principle of the specification. In the drawings:

FIG. 8 is a flowchart illustrating a method for controlling an HMD according to one embodiment of the present specification.

DETAILED DESCRIPTION OF THE INVENTION

Hereinafter, the embodiments will be described in detail with reference to the accompanying drawings. However, the present specification is not limited to the embodiments described herein.

Although the terms used in the present specification are selected from generally known and used terms, terms used herein may be variable depending on operator's intention or customs in the art, appearance of a new technology, or the like. In addition, some of the terms mentioned in the description of the present specification have been selected by the applicant at his or her discretion, the detailed meanings of which are described in relevant parts of the description herein. Furthermore, it is required that the present specification is understood, not simply by the actual terms used but by the meanings of each term lying within.

In the present specification, a head mounted display (HMD) may mean a wearable device worn on a body of a user to display visual information. For example, the HMD may be a wearable device which is worn on the head of a user to display an augmented reality image. In addition, in the present specification, the augmented reality image is a virtual image and may include graphic images, text, symbols and emoticons.

Figure 1:
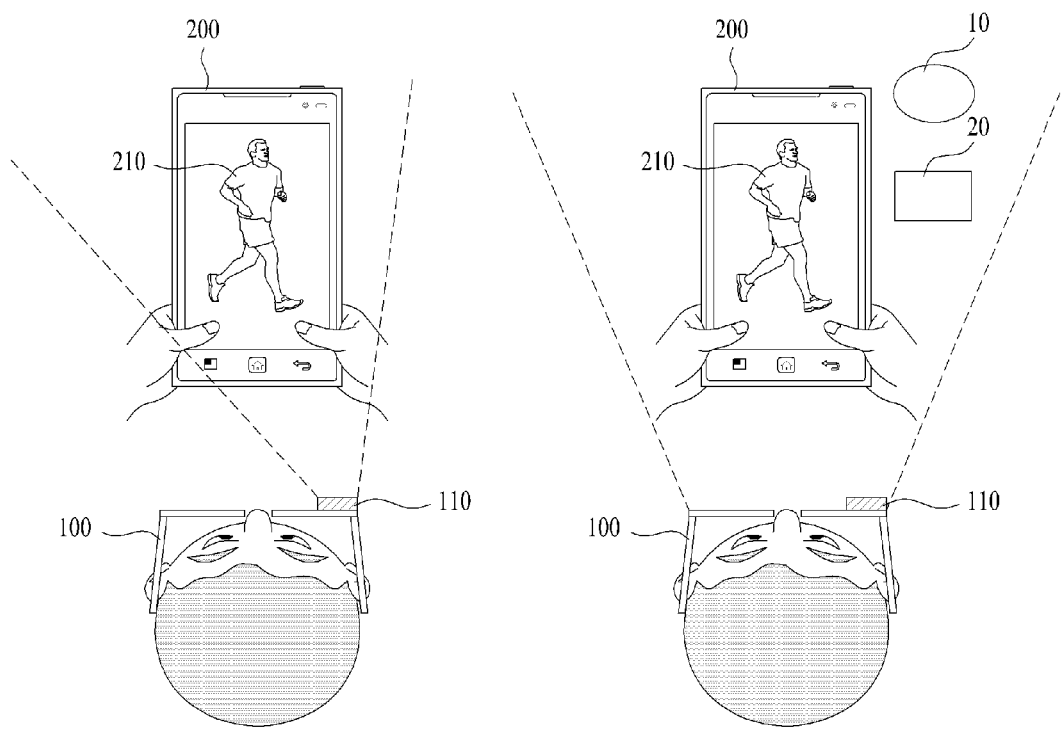
FIG. 1 is a diagram showing a method for detecting an external device and displaying an augmented reality image at a head mounted display (HMD) according to one embodiment of the present specification.

FIG. 1 is a diagram showing a method for detecting an external device and displaying an augmented reality image in a head mounted display (HMD) according to one embodiment of the present specification.

More specifically, the left of FIG. 1 shows a method for, at an HMD 100, detecting an external device 200, on which a content image is displayed, using a camera unit 110 and the right of FIG. 1 shows a method for, at the HMD 100, displaying a first type augmented reality image 10 associated with the external device 200 and a second type augmented reality image 20 associated with the content image 210 displayed on the external device 200 using a display unit.

As shown in the left of FIG. 1, the HMD 100 may detect the external device 200 using the camera unit 110. That is, the HMD 100 may detect the external device 200 from the image captured by the camera unit 110. The external device 200 is a display device for displaying the content image 210. The content image 210 may mean an image corresponding to content displayed on the external device 200. The content image 210 may include a video content image and a photo content image.

When the external device 200 is detected, the HMD 100 may acquire external device information. The external device information may mean a variety of information about the external device 200. The device information may include type information of the external device 200, configuration information of the external device 200 and position and direction information of the external device 200.

The HMD 100 may acquire the external device information from the image captured by the camera unit 110. That is, the HMD 100 may detect the external device image from the image captured by the camera unit 110 and acquire the external device information from the detected external device image. At this time, the HMD 100 may acquire the external device information from the captured image using a pre-stored image analysis algorithm, etc. In addition, when the HMD 100 is paired with the external device 200, the HMD 100 may receive the external device information from the paired external device 200 via a communication unit.

When the external device 200 is detected, the HMD 100 may acquire content information. Here, the content information may mean a variety of information about the content image displayed on the external device 200. The content information may include substance information of the content image and position and direction information of the content image 210.

The HMD 100 may acquire content information using the camera unit 110. That is, the HMD 100 may detect the content image 210 displayed on the external device 200 from the image captured by the camera unit 110 and acquire the content information from the detected content image 210. At this time, the HMD 100 may detect the content image 210 using a pre-stored image analysis algorithm, etc. and acquire the content information from the detected content image 210. In addition, when the HMD 100 is paired with the external device 200, the HMD 100 may receive the content information from the paired external device 200 via a communication unit.

As shown in the right of FIG. 1, the HMD 100 may display the first type augmented reality image 10 and the second type augmented reality image 20 using the display unit.

Here, the first type augmented reality image 10 may be associated with the external device 200. For example, the first type augmented reality image 10 may be associated with components (e.g., control buttons such as a power button, a home button and a volume button) of the external device 200. The above-described augmented reality image is only an example of the first type augmented reality image 10 and the HMD 100 of the present specification is not limited to the embodiment.

The HMD 100 may acquire the first type augmented reality image 10 based on the external device information and display the first type augmented reality image on the display unit. In this case, if the display unit is composed of an optical see-through display panel, the HMD may display the first type augmented reality image 10 on the periphery of the external device 200 of the real world viewed via the see-through display panel. At this time, the HMD 100 may acquire the first type augmented reality image 10 from an internal storage unit or acquire the first type augmented reality image 10 from an external server via a communication unit.

The second type augmented reality image 20 may be associated with the content image 210 displayed on the external device 200. For example, the second type augmented reality image 20 may be associated with the content corresponding to the content image 210. The above-described augmented reality image is only an example of the second type augmented reality image 20 and the HMD 200 of the present specification is not limited to the embodiment.

The HMD 100 may acquire the second type augmented reality image 20 based on the content information and display the second type augmented reality image on the display unit. In this case, if the display unit is composed of an optical see-through display panel, the HMD may display the second type augmented reality image 20 on the periphery of the content image 210 of the real world viewed via the see-through display panel. At this time, the HMD 100 may acquire the second type augmented reality image 20 from an internal storage unit or acquire the second type augmented reality image 20 from an external server via a communication unit.

Hereinafter, the method for, at the HMD, displaying the first type augmented reality image to the third type augmented reality image according to rotation of the external device or the content image will be described. At this time, for convenience of description, in FIGS. 2 to 6, a point indicating a position and an arrow indicating a direction are additionally shown. For example, a point and arrow shown at the right upper side of the external device respectively indicate the position and direction of the external device, a point and arrow shown at the right upper side of the content image respectively indicate the position and direction of the content image, points and arrows shown in the first type augmented reality image to the third type augmented reality image respectively indicate the display positions and directions of the first type augmented reality image to the third type augmented reality image. The points and arrows shown in FIGS. 2 to 6 are virtual points and arrows for convenience of description and are not actually displayed on the display unit of the HMD.

Figure 2:
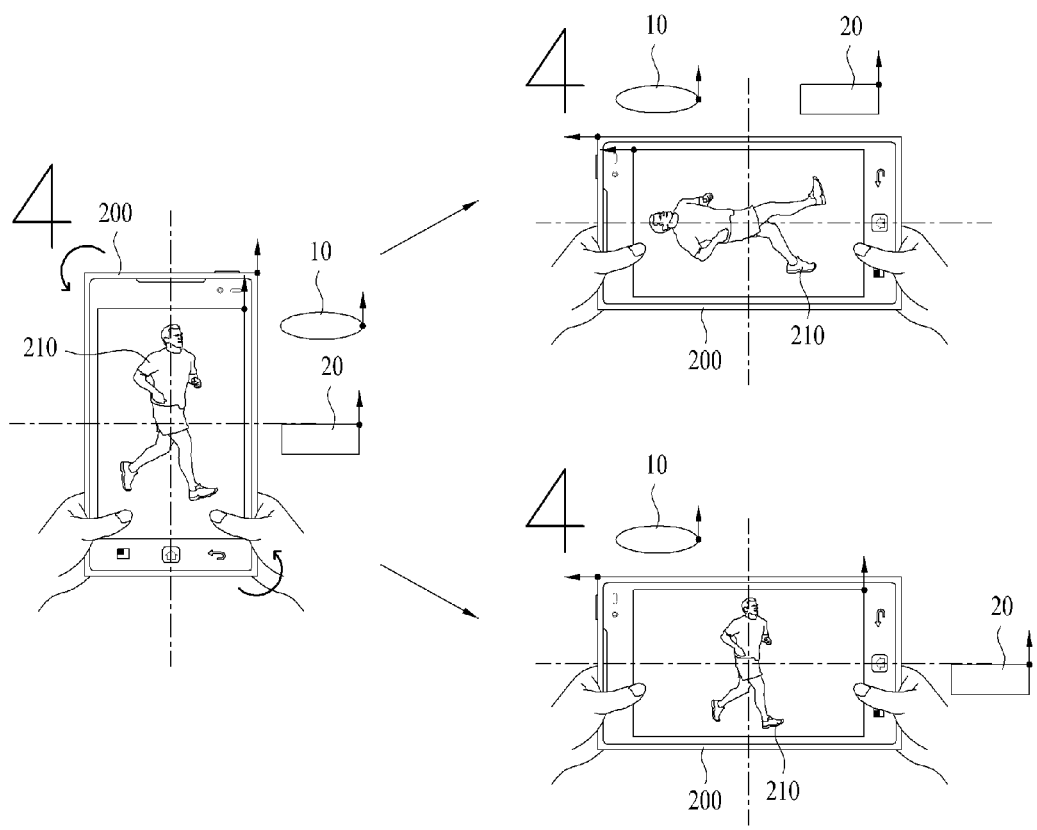
FIG. 2 is a diagram showing a method for displaying a first type augmented reality image and a second type augmented reality image according to rotation of an external device at an HMD according to one embodiment of the present specification.

FIG. 2 is a diagram showing a method for displaying a first type augmented reality image and a second type augmented reality image according to rotation of an external device at an HMD according to one embodiment of the present specification.

As shown in the left of FIG. 2, when the external image 200, on which the content image 210 is displayed, is detected, the HMD may display the first augmented reality image 10 and the second type augmented reality image 20.

The HMD may display the first type augmented reality image 10 using a predetermined display method. For example, as shown, the HMD may display the first type augmented reality image 10 at a first position in the same direction as the direction of the external device 200.

The HMD may display the second type augmented reality image 20 using a predetermined display method. For example, as shown, the HMD may display the second type augmented reality image 20 at a second position in the same direction as the direction of the content image 210.

The HMD may detect rotation of the external device 200 and the content image 210. In the present specification, rotation of the external device 200 and the content image 210 may mean rotation of the external device 200 and the content image 210 on the HMD, that is, does not mean rotation of the content image 210 on the external device 200 or rotation of the external device 200 on the content image 210. Rotation of the external device 200 and rotation of the content image 210 may be independent of each other. For example, even when the external device 200 does not rotate, if the display mode of the external device 200 is changed from a landscape mode to a portrait mode or from a portrait mode to a landscape mode, the HMD may detect independent rotation of the content image. Rotation of the content image 210 may depend on rotation of the external device 200.

According to one embodiment, the HMD may detect rotation of the external device 200 and the content image 210 from the image captured by the camera unit. According to another embodiment, the HMD may detect rotation of the external device 200 from the image captured by the camera unit and detect rotation of the content image 210 based on the content information received from the external device 200 via a communication unit.

As shown in the right upper and lower sides of FIG. 2, when rotation of the external device 200 is detected, the HMD may change the display position of the first type augmented reality image 10 according to rotation of the external device 200 and display the first type augmented reality image 10. For example, as shown in the right upper and lower sides of FIG. 2, when the external device 200 rotates by 90 degrees in a counter-clockwise direction, the HMD may change the display position of the first type augmented reality image 10 from a first position to a third position and display the first type augmented reality image 10. At this time, the HMD may maintain the display direction of the first type augmented reality image 10 in spite of rotation of the external device 200.

As shown in the right upper side of FIG. 2, when rotation of the content image 210 is detected, the HMD may change the display position of the second type augmented reality image 20 according to rotation of the content image 210 and display the second type augmented reality image 20. For example, as shown in the right upper side of FIG. 2, when the content image 210 rotates by 90 degrees in a counter-clockwise direction, the HMD may change the display position of the second type augmented reality image 20 from a second position to a fourth position and display the second type augmented reality image 20. At this time, the HMD may maintain the display direction of the second type augmented reality image 20 in spite of rotation of the content image 210.

As shown in the right lower side of FIG. 2, if rotation of the content image 210 is not detected, the HMD may maintain the display position of the second type augmented reality image 20 and display the second type augmented reality image 20 even when the external device 200 rotates. For example, as shown in the right lower side of FIG. 2, when the external device 200 rotates by 90 degrees in a counter-clockwise direction but the content image 210 does not rotate, the HMD may maintain the display position of the second type augmented reality image 20 at the second position and display the second type augmented reality image 20 in spite of rotation of the external device 200. At this time, the HMD may maintain the display direction of the second type augmented reality image 20.

As described above, change in display position of the first type augmented reality image 10 may depend on rotation of the external device 200. In addition, change in display position of the second type augmented reality image 20 may depend on rotation of the content image 210 but may be independent of rotation of the external device 200.

Figure 3:
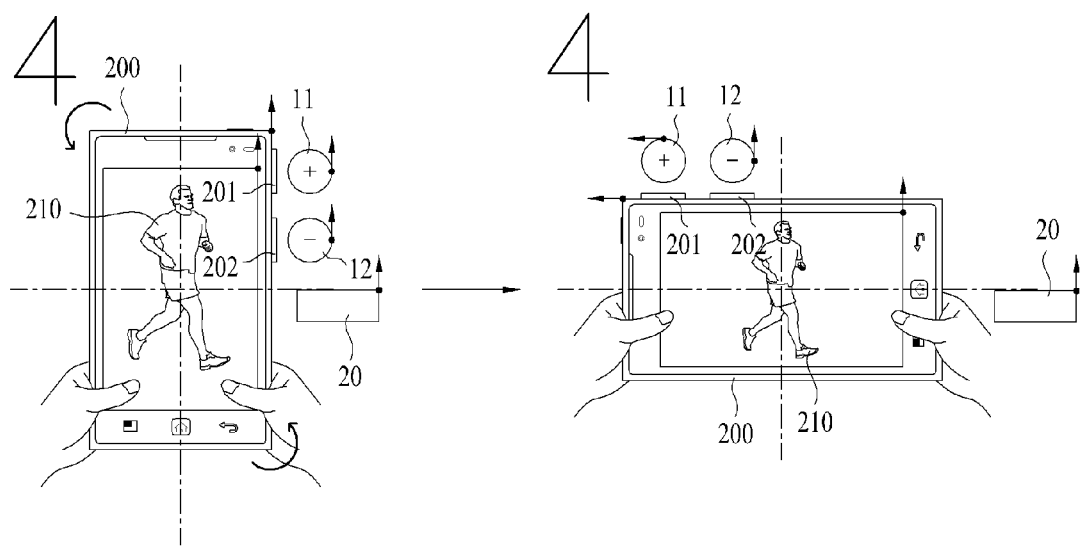
FIG. 3 is a diagram showing a method for displaying a first type augmented reality image and a second type augmented reality image according to rotation of an external device at an HMD according to another embodiment of the present specification.

FIG. 3 is a diagram showing a method for displaying a first type augmented reality image and a second type augmented reality image according to rotation of an external device at an HMD according to another embodiment of the present specification.

More specifically, FIG. 3 shows a method for, the HMD, displaying a first subtype 11 of a first type augmented reality image, a second subtype 12 of the first type augmented reality image and a second type augmented reality image 20 according to rotation of the external device 200. In FIG. 3, a detailed description of parts similar or equal to those shown in FIG. 2 will be omitted.

The first subtype 11 (hereinafter, referred to as a first subtype augmented reality image 11) of the first type augmented reality image is associated with the external device 200 and may mean an augmented reality image, the display position and direction of which are changed according to rotation of the external device 200. According to one embodiment, among augmented reality images associated with the external device 200, augmented reality images composed of images without directivity may be set as the first subtype augmented reality image 11.

The second subtype 12 (hereinafter, referred to as a second subtype augmented reality image 12) of the first type augmented reality image is associated with the external device 200 and may mean an augmented reality image, the display position of which is changed according to rotation of the external device 200, and the display direction of which is maintained. According to one embodiment, among augmented reality images associated with the external device 200, augmented reality images composed of images with directivity may be set as the second subtype augmented reality image 12.

As shown in FIG. 3, the external device 200 may be a smartphone. The first subtype augmented reality image 11 may be associated with a volume up button of the external device 200 and include a symbol "+" without directivity. The second subtype augmented reality image 12 may be associated with a volume down button of the external device 200 and include a symbol "−" with directivity.

As shown in the left of FIG. 3, when the external device 200, on which the content image 210 is displayed, is detected, the HMD may display the first subtype augmented reality image 11, the second subtype augmented reality image 12 and the second type augmented reality image 20 using a predetermined display method.

For example, as shown in the left of FIG. 3, the first subtype augmented reality image 11 may be displayed at a first position based on the position of the volume up button 201 of the external device 200 and the second subtype augmented reality image 12 may be displayed at a second position based on the position of the volume down button of the external device 200. That is, the HMD may display the first subtype augmented reality image 11 at a position adjacent to the position of the volume up button 201 of the external device 200 and display the second subtype augmented reality image 12 at a position adjacent to the position of the volume down button 202 of the external device 200.

For example, as shown in the left of FIG. 3, the HMD may display the second type augmented reality image 20 at a third position.

As shown in the right of FIG. 3, when rotation of the external device 200 is detected, the HMD may change the display position and direction of the first subtype augmented reality image 11 according to rotation of the external device 200 and display the first subtype augmented reality image 11. For example, as shown in the right of FIG. 3, when the external device 200 rotates by 90 degrees in a counter-clockwise direction, the HMD may change the display position of the first subtype augmented reality image 11 from a first position to a fourth position based on the changed position of the external device 200, change the display direction of the first subtype augmented reality image 11 based on the changed direction of the external device 200 and display the first subtype augmented reality image. That is, the HMD may display the first subtype augmented reality image 11 at the position adjacent to the changed position of the external device 200 in the direction corresponding to the changed direction.

As shown in the right of FIG. 3, when rotation of the external device 200 is detected, the HMD may change the display position of the second subtype augmented reality image 12 according to rotation of the external device 200 and display the second subtype augmented reality image 12, and maintain the display direction of the second subtype augmented reality image 12. For example, as shown in the right of FIG. 3, when the external device 200 rotates by 90 degrees in a counter-clockwise direction, the HMD may change the display position of the second subtype augmented reality image 12 from a second position to a fifth position based on the changed position of the external device 200 and maintain the display direction of the second subtype augmented reality image 12. That is, the HMD may display the second subtype augmented reality image 12 at the position adjacent to the changed position of the external device 200 and maintain the display direction of the second subtype augmented reality image 12.

As shown in the right of FIG. 3, if rotation of the content image 210 is not detected, the HMD may maintain the display direction of the second type augmented reality image 20 even when the external device 200 rotates. For example, as shown in the right of FIG. 3, when the external device 200 rotates by 90 degrees in a counter-clockwise direction but the content image 210 does not rotate, the HMD maintain the display direction of the second type augmented reality image 20 in spite of rotation of the external device 200. At this time, the HMD may change the display position of the second type augmented reality image 20 from a third position to a sixth position based on the position of the external device 200. For example, when the external device 200 and the second type augmented reality image 20 overlap according to rotation of the external device 200, the HMD may change the display location of the second type augmented reality image 20.

As described above, the change in display position and direction of the first subtype augmented reality image 11 may depend on rotation of the external device 200. Change in display position of the second subtype augmented reality image 12 depends on rotation of the external device 200 but change in display direction of the second subtype augmented reality image 12 may be independent of rotation of the external device 200.

Figure 4:
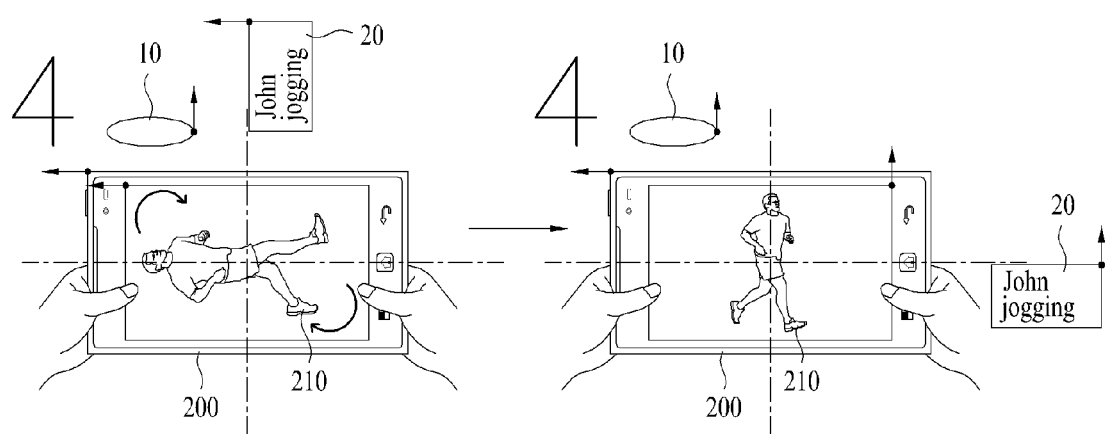
FIG. 4 is a diagram showing a method for displaying a first type augmented reality image and a second type augmented reality image according to rotation of a content image at an HMD according to one embodiment of the present specification.

FIG. 4 is a diagram showing a method for displaying a first type augmented reality image and a second type augmented reality image according to rotation of a content image at an HMD according to one embodiment of the present specification.

As shown in FIG. 4, the external device 200 may be a smartphone and the content image 210 may be a video image of content "John jogging". The second type augmented image 20 may be associated with the substance of the content image 210 and include text "John jogging".

As shown in the left of FIG. 4, when the external image, on which the content image 210 is displayed, is detected, the HMD may display the first type augmented reality image 10 and the second type augmented reality image 20 using a predetermined method.

For example, as shown in the left of FIG. 4, the MID may display the first type augmented reality image 10 at a first position in a direction different from the direction of the external device 200.

For example, as shown in the left of FIG. 4, the HMD may display the second type augmented reality image 20 at a second position in the same direction as the direction of the content image 210.

As shown in the right of FIG. 4, when rotation of the content image 210 is detected, the HMD may change the display position of the second type augmented reality image 20 according to rotation of the content image 210 and display the second type augmented reality image 20. For example, as shown in the right of FIG. 2, when the content image 210 rotates by 90 degrees in a clockwise direction, the HMD may change the display position of the second type augmented reality image 20 from a second position to a third position based on the changed position of the content image 210 and display the second type augmented reality image 20. Further, the HMD may further change the display direction of the second type augmented reality image 20 in the same direction as the changed direction of the content image 210 and display the second type augmented reality image 20. Accordingly, the HMD may continuously provide the user with the second type augmented reality image 20 displayed in the same direction as the content image 210 in spite of rotation of the content image 210.

As shown in the right of FIG. 4, if rotation of the external device 200 is not detected, even when the content image 210 rotates, the HMD may maintain the display position of the first type augmented reality image 10 and display the first type augmented reality image. For example, as shown in the right of FIG. 4, when the content image 210 rotates by 90 degrees in a clockwise direction but the external device 200 does not rotate, the HMD may maintain the display position of the second type augmented reality image 20 and display the second type augmented reality image in spite of rotation of the content image 210. At this time, the HMD may maintain the display direction of the first type augmented reality image 10. Accordingly, the HMD may provide the user with the first type augmented reality image 10 having the same position and direction in spite of rotation of the content image.

As described above, change in display position of the second type augmented reality image 20 may depend upon rotation of the content image 210 but change in display position of the first type augmented reality image 10 may be independent of rotation of the content image 210.

Figure 5:
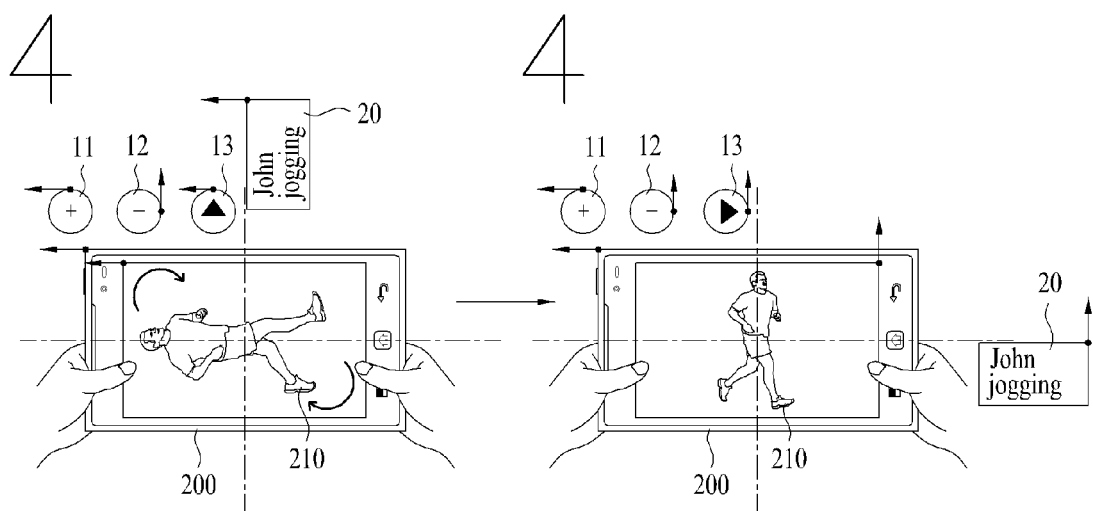
FIG. 5 is a diagram showing a method for displaying a first type augmented reality image and a second type augmented reality image according to rotation of a content image at an HMD according to another embodiment of the present specification.

FIG. 5 is a diagram showing a method for displaying a first type augmented reality image and a second type augmented reality image according to rotation of a content image at an HMD according to another embodiment of the present specification.

More specifically, FIG. 5 shows a method for, at the HMD, displaying a first subtype 11 (hereinafter, referred to as a first subtype augmented reality image 11) of a first type augmented reality image, a second subtype 12 (hereinafter, referred to as a second subtype augmented reality image 12) of the first type augmented reality image, a third subtype 13 of the first type augmented reality image and a second type augmented reality image 20 according to rotation of the external device 200. In FIG. 5, a detailed description of parts similar or equal to those shown in FIGS. 1 to 4 will be omitted.

The third subtype 13 (hereinafter, referred to as a third subtype augmented reality image 13) of the first type augmented reality image is associated with the external device 200 and may mean an augmented reality image, the display direction of which is changed according to rotation of the content image 210. According to one embodiment, among augmented reality images associated with the external device 200, augmented reality images including an image related to content display may be set as the third subtype augmented reality image 13.

As shown in FIG. 5, the external device 200 may be a smartphone. The first subtype augmented reality image 11 and the second subtype augmented reality image 12 are equal to the first subtype augmented reality image 11 and the second subtype augmented reality image 12 described with reference to FIG. 3 and thus a detailed description thereof will be omitted. The third subtype augmented reality image 13 may be associated with a content playback button of the external device 200 and include an icon indicating content playback. The second type augmented reality image 20 is equal to the second type augmented reality image 20 described with reference to FIG. 4 and thus a detailed description thereof will be omitted.

As shown in the left of FIG. 5, when the external device 200, on which the content image 210 is displayed, is detected, the HMD may display the first subtype augmented reality image 11, the second subtype augmented reality image 12, the third subtype augmented reality image 13 and the second type augmented reality image 20 using a predetermined display method.

For example, as shown in the left of FIG. 5, the HMD may display the first subtype augmented reality image 11 at a first position based on the volume up button of the external device 200 and display the second subtype augmented reality image 12 at a second position based on the volume down button of the external device 200. In addition, the HMD may display the third subtype augmented reality image 13 at a third position in the same direction as the direction of the content image 210.

For example, as shown in the left of FIG. 5, the HMD may display the second type augmented reality image 20 at a fourth position.

As shown in the right of FIG. 5, when rotation of the content image 210 is detected, the HMD may change the display position of the second type augmented reality image 20 according to rotation of the content image 210 and display the second type augmented reality image 20. For example, as shown in the right of FIG. 2, when the content image 210 rotates by 90 degrees in a clockwise direction, the HMD may change the display position of the second type augmented reality image 20 from a fourth position to a fifth position based on the changed position of the content image 210 and display the second type augmented reality image 20. Further, the HMD may further change the display direction of the second type augmented reality image 20 in the same direction as the changed direction of the content image 210 and display the second type augmented reality image 20.

As shown in the right of FIG. 5, when rotation of the external device 200 is not detected, even when the content image 210 rotates, the HMD may maintain the display positions of the first subtype augmented reality image and the second subtype augmented reality image 12 and display the first subtype augmented reality image and the second subtype augmented reality image 12. For example, as shown in the right of FIG. 5, when the content image rotates by 90 degrees in a clockwise direction but the external device 200 does not rotate, the HMD may continuously display the first subtype augmented reality image at the first position and continuously display the second subtype augmented reality image at the second position in spite of rotation of the content image 210. Further, the HMD may maintain the display directions of the first subtype augmented reality image 11 and the second subtype augmented reality image 12.

As shown in the right of FIG. 5, when rotation of the external device 200 is not detected but rotation of the content image 210 is detected, the HMD may change the display direction of the third subtype augmented reality image 13 according to rotation of the content image 210 and display the third subtype augmented reality image. For example, as shown in the right of FIG. 5, when the content image 210 rotates by 90 degrees in a clockwise direction but the external device 200 does not rotate, the HMD may further change the display direction of the third subtype augmented reality image 13 based on the changed direction of the content image 210 and display the third subtype augmented reality image although the external device 200 does not rotate. The HMD may change the display direction of the third subtype augmented reality image 13 in the same direction as the changed direction of the content image 210 and display the third subtype augmented reality image. At this time, the display position of the third subtype augmented reality image may be maintained at the third position.

As described above, change in display position of the first type augmented reality image 10 may be independent of rotation of the content image 210 regardless of the subtype but change in display direction of the third subtype of the first type augmented reality images 10 may be depend on rotation of the content image 210.

Figure 6:
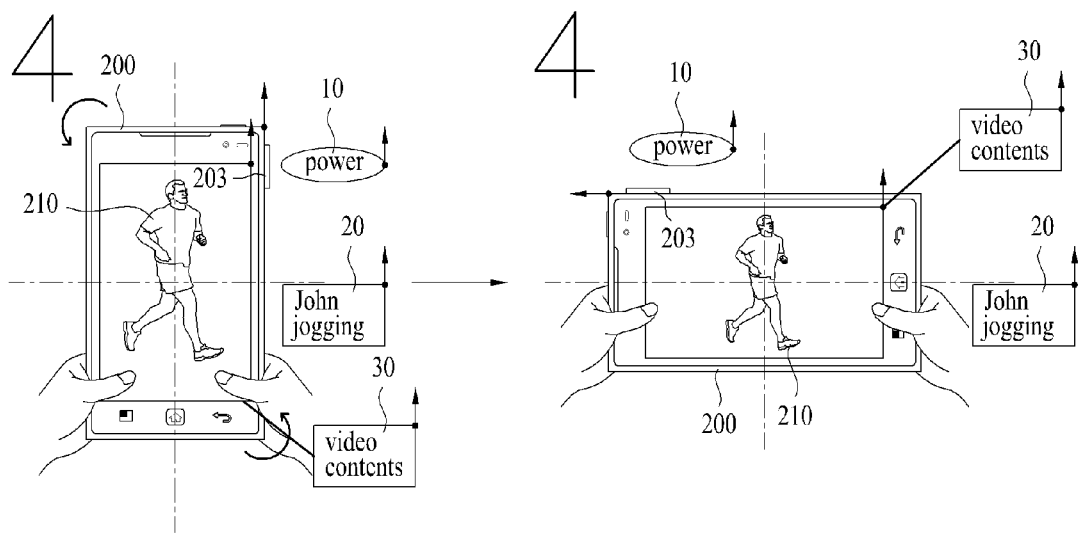
FIG. 6 is a diagram showing a method for displaying a first type augmented reality image to a third type augmented reality image according to rotation of an external device at an HMD according to another embodiment of the present specification.

FIG. 6 is a diagram showing a method for displaying a first type augmented reality image to a third type augmented reality image according to rotation of an external device at an HMD according to another embodiment of the present specification.

The third type augmented reality image 30 may be associated with the content image and may mean the augmented reality image, at least one of the display position and the display direction of which is changed according to rotation of the external device 200 even when the content image 210 does not rotate.

In FIG. 6, the external device 200 may be a smartphone and the content image 210 may be a video image of the content "John jogging". The first type augmented reality image 10 may be associated with a power button of the external device 200 and may include text "power". The second type augmented reality image 20 may be associated with the content of the content image 210 and may include text "John jogging". The third type augmented reality image 30 may be associated with the kind of the content image 210 and may include text "video contents".

As shown in the left of FIG. 6, when the external device 200, on which the content image 210 is displayed, is detected, the HMD may display the first type augmented reality image 10, the second type augmented reality image 20 and the third type augmented reality image 30 using a predetermined display method.

For example, as shown in the left of FIG. 6, the HMD may display the first type augmented reality image 10 at a first position based on the position of a power button 203 of the external device 200. The HMD may display the second type augmented reality image 20 at a second position and display the third type augmented reality image 30 at a third position. At this time, the HMD may further display an indicator for connecting the third type augmented reality image 30 with the content image 210.

As shown in the right of FIG. 6, when rotation of the external device 200 is detected, the HMD may change the display position of the first type augmented reality image 10 according to rotation of the external device and display the first type augmented reality image. For example, as shown in the right of FIG. 3, when the external device 200 rotates by 90 degrees in a counter-clockwise direction, the HMD may change the display position of the first type augmented reality image 10 from a first position to a fourth position based on the changed position of the external device 200.

As shown in the right of FIG. 6, if rotation of the content image 210 is not detected, the HMD may maintain the display position of the second type augmented reality image 20 even when the external device 200 rotates. For example, as shown in the right of FIG. 3, when the external device 200 rotates by 90 degrees in a counter-clockwise direction but the content image 210 does not rotate, the HMD may maintain the display position of the second type augmented reality image 20 at the second position in spite of rotation of the external device 200. At this time, the HMD may maintain the display direction of the second type augmented reality image 20.

As shown in the right of FIG. 6, when rotation of the content image 210 is not detected but rotation of the external device 200 is detected, the HMD may change the display position of the third type augmented reality image 30 according to rotation of the external device 200 and display the third type augmented reality image. For example, a shown in the right of FIG. 6, when the external device 200 rotates by 90 degrees in a counter-clockwise direction but the content image 210 does not rotate, the HMD may change the display position of the third type augmented reality image 30 from a third position to a fifth position based on the changed position of the external device 200 and display the third type augmented reality image. The HMD may change the display direction of the third type augmented reality image 30 according to rotation of the external device 200.

As described above, the second type augmented reality image 20 and the third type augmented reality image 30 are both associated with the content image 210. However, change in display position and direction of the second type augmented reality image 20 may be independent of rotation of the external device 200 but change in display position and direction of the third type augmented reality image 30 may depend on rotation of the external device 200.

Figure 7:
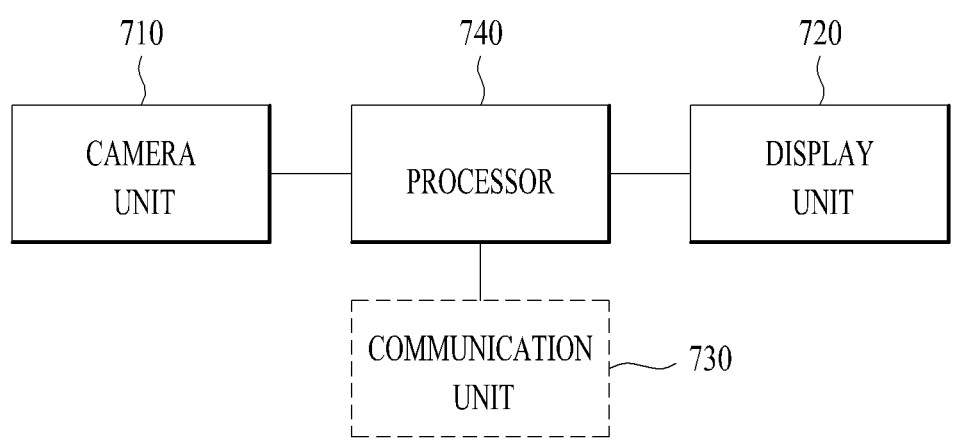
FIG. 7 is a block diagram showing the configuration of an HMD according to one embodiment of the present specification.

FIG. 7 is a block diagram showing the configuration of an HMD according to one embodiment of the present specification. In FIG. 7, a detailed description of parts similar or equal to those shown in FIGS. 1 to 6 will be omitted.

Operations of the below-described processor 740 correspond to operations of the HMD described above with reference to the figures. That is, in the present specification, the processor 740 is described as being equated with the HMD.

Referring to FIG. 7, the HMD may include a camera unit 710, a display unit 720, a communication unit 730 and a processor 740. Here, the communication unit 730 is optional.

The camera unit 710 may capture an image within an angle of view. In the present specification, the camera unit 710 may capture an image located in a front direction of the HMD and deliver the captured image to the processor 740. At this time, the captured image may include the image of the external device and the image of the content displayed on the external device.

The display unit 720 may display the image. In the present specification, the display unit 720 may display an augmented reality image. In the present specification, the augmented reality image may include a first type augmented reality image associated with the external device and may include second and third type augmented reality images associated with the content image displayed on the external device. The first type augmented reality image may be divided into a first subtype, a second subtype and a third subtype based on a difference in method for changing the display position and direction according to rotation of the external device or the content image.

The display unit 720 may be composed of an optical see-through display panel. If the display unit 720 is composed of an optical see-through display panel, the HMD may display the augmented reality image on the periphery of the external device of the real world viewed by the user via the see-through display panel.

The communication unit 730 may perform data communicate with the external device. In the present specification, the communication unit 730 may pair the HMD with the external device. More specifically, the communication unit 730 may transmit/receive pairing information for pairing the HMD with the external device and pair the HMD with the external device based on the pairing information. Pairing may mean wired/wireless connection between the HMD and the external device. The method for connecting the HMD and the external device by wire or wirelessly is not limited.

In addition, the communication unit 730 may receive external device information and content information from the external device paired with the HMD. The external device information may mean a variety of information about the external device. The external device information may include type information of the external device, configuration information of the external device and position and direction information of the external device. Here, the content information may mean a variety of information about the content image displayed on the external device. The content information may include substance information of the content image and position and direction information of the content image.

The processor 740 may control at least one unit included in the HMD. More specifically, the processor 740 may control the above-described units and control data transmission and/or reception between the units.

In the present specification, the processor 740 may detect the external device. The processor 740 may detect the external device from the image captured by the camera unit 710. When the external device is detected, the processor 740 may acquire the external device information or the content information. In this case, the processor 740 may acquire the external device information and the content information from the image captured by the camera unit 710. In addition, when the HMD is paired with the external device, the processor 740 may receive the external device information and the content information from the paired external device via the communication unit 730. In addition, the processor 740 may acquire the external device information from the image captured by the camera unit 710 and acquire the content information from the paired external device via the communication unit 730.

In addition, the processor 740 may display the first type augmented reality image associated with the external device and display the second type augmented reality image associated with the content image. At this time, the processor 740 may display the first type augmented reality image based on the external device information and display the second type augmented reality image based on the content information. That is, the processor 740 may display the first type augmented reality image based on the position or direction of the external device and display the second type augmented reality image based on the position or direction of the content image. For example, the processor 740 may display the first type augmented reality image at a position adjacent to the position of the external device and display the second type augmented reality image in the same direction as the direction of the content image.

The processor 740 may detect rotation of the external device and the content image. At this time, the processor 740 may detect rotation of the external device and the content image from the image captured by the camera unit 710. In addition, the processor 740 may detect rotation of the external device from the image captured by the camera unit 710 and detect rotation of the content image based on the content information received from the external device via the communication unit 730.

In addition, when rotation of the external device is detected, the processor 740 may change at least one of the display position and the display direction of the first type augmented reality image according to rotation of the external device and display the first type augmented reality image. For example, in the case of the first subtype of the first type augmented reality image, the processor 740 may change the display position and direction of the first subtype augmented reality image according to rotation of the external device and display the first subtype augmented reality image. As another example, in the case of the second subtype of the first type augmented reality image, the processor 740 may change the display position of the second subtype augmented reality image according to rotation of the external device, display the second subtype augmented reality image, and maintain the display direction of the second subtype augmented reality image.

When rotation of the content image is detected, the processor 740 may change at least one of the display position and the display direction of the second type augmented reality image according to rotation of the content image and display the second type augmented reality image. For example, the processor 740 may change the display position of the second type augmented reality image based on the changed position of the content image according to rotation of the external device, change the display direction of the second type augmented reality image in the same direction as the changed direction of the content image, and display the second type augmented reality image.

FIG. 8 is a flowchart illustrating a method for controlling an HMD according to one embodiment of the present specification. In this flowchart, a detailed description of parts similar or equal to those shown in FIGS. 1 to 7 will be omitted.

Referring to FIG. 8, the HMD may detect the external device (S810). The HMD may detect the external device using the camera unit. That is, the HMD may detect the external device from the image captured by the camera unit. Here, the external device may mean a display device for displaying a content image. Here, the content image may mean an image corresponding to content displayed on the external device.

When the external device is detected, the HMD may acquire the external device information. The external device information may mean a variety of information about the external device. The external device information may include type information of the external device, configuration information of the external device and position and direction information of the external device. The method for, at the HMD, acquiring the external device information is equal to that described with reference to FIG. 1 and thus a detailed description thereof will be omitted.

When the external device is detected, the HMD may acquire content information. Here, the content information may mean a variety of information about the content image displayed on the external device. The content information may include substance information of the content image and position and direction information of the content image. The method for, at the HMD, acquiring the content information is equal to that described with reference to FIG. 1 and thus a detailed description thereof will be omitted.

Next, the HMD may display the first type augmented reality image associated with the external device (S820). At this time, the HMD may display the first type augmented reality image using the display unit. Here, the first type augmented reality image may be associated with the external device. According to one embodiment, the HMD may acquire the first type augmented reality image based on the external device information and display the first type augmented reality image on the display unit. At this time, the HMD may acquire the first type augmented reality image from the internal storage unit or acquire the first type augmented reality image from the external server via the communication unit.

Next, the HMD may display the second type augmented reality image associated with the content image (S830). At this time, the HMD may display the second type augmented reality image using the display unit. Here, the second type augmented reality image may be associated with the content image displayed on the external device. According to one embodiment, the HMD may acquire the second type augmented reality image based on the content information and display the second type augmented reality image on the display unit. At this time, the HMD may acquire the second type augmented reality image from the internal storage unit or acquire the second type augmented reality image from the external server via the communication unit.

Next, the HMD may detect rotation of the external device or the content image (S840). In the present specification, rotation of the external device and the content image may mean rotation of the external device and the content image on the HMD, that is, does not mean rotation of the content image on the external device or rotation of the external device on the content image. Rotation of the external device and rotation of the content image may be independent of each other. Rotation of the content image may depend on rotation of the external device.

According to one embodiment, the HMD may detect rotation of the external device and the content image from the image captured by the camera unit. According to another embodiment, the HMD may detect rotation of the external device from the image captured by the camera unit and detect rotation of the content image based on the content information received from the external device via the communication unit.

Next, when rotation of the external device is detected, the HMD may change the display position of the first type augmented reality image according to rotation of the external device and display the first type augmented reality image (S850). In this case, as shown in the right upper and lower sides of FIG. 2, the HMD may maintain the display direction of the first type augmented reality image in spite of rotation of the external device. As shown in FIG. 3, the HMD may further change the display direction of the first type augmented reality image according to rotation of the external device and display the first type augmented reality image.

Next, when rotation of the content image is detected, the HMD may change the display position of the second type augmented reality image according to rotation of the content image and display the second type augmented reality image (S860). In this case, as shown in the right upper side of FIG. 2, the HMD may maintain the display direction of the second type augmented reality image in spite of rotation of the content image. In addition, as shown in FIG. 4, the HMD may further change the display direction of the second type augmented reality image according to rotation of the content image and display the second type augmented reality image.

As shown in the right lower side of FIG. 2, if rotation of the content image is not detected, even when the external device rotates, the HMD may maintain the display position of the second type augmented reality image and display the second type augmented reality image. In this case, the HMD may maintain the display direction of the second type augmented reality image.

According to the present specification, the HMD may detect an external device, on which a content image is displayed, and display a first type augmented reality image associated with the external device and a second type augmented reality image associated with the content image.

According to the present specification, the HMD may detect rotation of the external device or the content image, change a display position of the first type augmented reality image according to rotation of the external device and display the first type augmented reality image, and change a display position of the second type augmented reality image according to rotation of the content image and display the second type augmented reality image. Accordingly, the HMD can provide a user with an augmented reality image having different position attributes according to rotation of the external device and the content image.

According to the present specification, the HMD may change a display direction of the first type augmented reality image according to rotation of the external device and display the first type augmented reality image, and change a display direction of the second type augmented reality image according to rotation of the content image and display the second type augmented reality image. Accordingly, the HMD can provide a user with an augmented reality image having different direction attributes according to rotation of the external device and the content image.

Although the preferred embodiments of the present specification have been disclosed for illustrative purposes, those skilled in the art will appreciate that various modifications, additions and substitutions are possible, without departing from the scope and spirit of the specification as disclosed in the accompanying claims. Such modifications should not be individually understood from the technical spirit or prospect of the present specification.

The HMD and the method for controlling the same of the present specification may be implemented as code that can be written to a processor-readable recording medium and can thus be read by a processor. The processor-readable recording medium may be any type of recording device in which data can be stored in a processor-readable manner. Examples of the processor-readable recording medium include a ROM, a RAM, a magnetic tape, a floppy disk, an optical data storage, and a carrier wave (e.g., data transmission over the Internet). The processor-readable recording medium can be distributed over a plurality of computer systems connected to a network so that processor-readable code is written thereto and executed therefrom in a decentralized manner.

In the present specification, the terms "angle", "distance" and "direction" may indicate an accurate angle, distance and direction or include a substantial angle, distance and direction of a predetermined range, respectively. That is, the angle, distance and direction of the present specification may indicate a substantial angle, distance and direction with errors.

Both apparatus and method inventions are mentioned in this specification and descriptions of both of the apparatus and method inventions may be complementarily applicable to each other.

It will be apparent to those skilled in the art that various modifications and variations can be made in the present specification without departing from the spirit or scope of the specifications. Thus, it is intended that the present specification covers the modifications and variations of this specification provided they come within the scope of the appended claims and their equivalents.

What is claimed is:

1. A head mounted display (HMD) comprising:
a camera to capture an image located in a front direction of the HMD;
a display to display an augmented reality image; and
a processor to:
control the camera and the display,
detect an external device, wherein the external device displays a content image,
display a first type augmented reality image associated with the external device,
display a second type augmented reality image associated with the content image displayed on the external device,
change a display position of the first type augmented reality image according to a rotation of the external device,
change a display position of the second type augmented reality image according to a rotation of the content image, and if the content image is not rotated, maintain the display position of the second type augmented reality image even when the external device is rotated.

2. The HMD according to claim 1, wherein, if the external device is not rotated, the processor further maintains the display position of the first type augmented reality image when the content image is rotated.

3. The HMD according to claim 1, wherein the processor further changes a display direction of the first type augmented reality image according to the rotation of the external device.

4. The HMD according to claim 1, wherein the processor further changes a display direction of the second type augmented reality image according to the rotation of the content image.

5. The HMD according to claim 3, wherein, if the external device is not rotated, the processor further maintains the display direction of the first type augmented reality image when the content image is rotated.

6. The HMD according to claim 4, wherein, if the content image is not rotated, the processor further maintains the display direction of the second type augmented reality image when the external device is rotated.

7. The HMD according to claim 3, wherein the first type augmented reality image includes
   a first subtype, a display position and a display direction of which are changed according to the rotation of the external device; and
   a second subtype, a display position of which is changed according to the rotation of the external device, a display direction thereof being maintained.

8. The HMD according to claim 7, wherein the first type augmented reality image further includes a third subtype, a display direction of which is changed according to the rotation of the content image, even when the external device is not rotated.

9. The HMD according to claim 1, wherein the processor further displays, via the display, a third type augmented reality image which is associated with the content image and, at least one of a display position and a display direction of which is changed according to the rotation of the external device even when the content image is not rotated.

10. The HMD according to claim 1, wherein the rotation of the external device and the rotation of the content image are independent of each other.

11. The HMD according to claim 1, wherein the processor detects the rotation of the content image if a display mode of the external device is changed from a landscape mode to a portrait mode or from a portrait mode to a landscape mode, even when the external device is not rotated.

12. The HMD according to claim 1, wherein:
   the display position of the first type augmented reality image depends on a position of the external device and is independent of a position of the content image, and
   the display position of the second type augmented reality image depends on a position of the content image and is independent of a position of the external device.

13. The HMD according to claim 1, wherein the display direction of the second augmented reality image depends on a direction of the content image.

14. The HMD according to claim 1, wherein the processor detects the external device from the captured image and acquires external device information of the detected external device.

15. The HMD according to claim 14, wherein the processor detects the content image from the captured image and acquires content information of the detected content image.

16. The HMD according to claim 15, further comprising a communication unit that pairs the HMD with the external device,
   wherein the processor acquires at least one of the external device information and the content information from the paired external device.

17. The HMD according to claim 14, wherein the external device information includes type information, position information and direction information of the external device.

18. The HMD according to claim 15, wherein the content information includes at least one of substance information, position information and direction information of the content image.

* * * * *